US012636949B2

(12) United States Patent
    Gralde Stålhandske et al.

(10) Patent No.:    US 12,636,949 B2
(45) Date of Patent:       May 26, 2026

(54) METHOD AND A CONTROL ARRANGEMENT FOR DETERMINING THE STATUS OF A FLUID TANK

(71) Applicant: Scania CV AB, Södertälje (SE)

(72) Inventors: Marcus Gralde Stålhandske, Trångsund (SE); Joakim Kareliusson, Hägersten (SE); Johan Linder, Ekerö (SE)

(73) Assignee: Scania CV AB, Södertälje (SE)

( * ) Notice:    Subject to any disclaimer, the term of this patent is extended or adjusted under 35 U.S.C. 154(b) by 360 days.

(21) Appl. No.:    18/566,930

(22) PCT Filed:    Jun. 2, 2022

(86) PCT No.:    PCT/SE2022/050530
    § 371 (c)(1),
    (2) Date:    Dec. 4, 2023

(87) PCT Pub. No.:    WO2022/265558
    PCT Pub. Date: Dec. 22, 2022

(65) Prior Publication Data
    US 2024/0270065 A1      Aug. 15, 2024

(30) Foreign Application Priority Data
    Jun. 15, 2021    (SE) .................................. 2150772-8

(51) Int. Cl.
    *B60K 15/035*        (2006.01)
    *B60K 15/03*          (2006.01)
(52) U.S. Cl.
    CPC .. *B60K 15/03006* (2013.01); *B60K 15/03519* (2013.01); *B60K 2015/03217* (2013.01); *B60K 2015/03514* (2013.01)

(58) Field of Classification Search
    CPC .... B60K 2015/03013; B60K 15/03519; B60K 15/03006; B60K 2015/03514;
    (Continued)

(56) References Cited

U.S. PATENT DOCUMENTS

| | | |
|---|---|---|
| 2014/0096539 A1 | 4/2014 | Gustafson et al. |
| 2016/0017835 A1 | 1/2016 | Garner et al. |

(Continued)

FOREIGN PATENT DOCUMENTS

| | | |
|---|---|---|
| CN | 105745428 A | 7/2016 |
| CN | 107735613 A | 2/2018 |

(Continued)

OTHER PUBLICATIONS

Sep. 17, 2025—(CN) First Office Action—App. No. 202280041891.8.

(Continued)

*Primary Examiner* — Timothy P. Kelly
(74) *Attorney, Agent, or Firm* — Banner & Witcoff, Ltd.

(57)        ABSTRACT

A method and a control arrangement for determining the status of a primary fluid tank or one or more secondary fluid tanks, each of the fluid tanks being arranged to contain a fluid or a mixture of fluids available in liquefied form and vaporised form and be connected to a second pressurized fluid conduit arrangement. The control arrangement determines a pressure drop ($\Delta p$) associated with the fluid flow through the second pressurized fluid conduit arrangement. When the pressure drop ($\Delta p$) exceeds a threshold, the control arrangement blocks the fluid flow from one of the fluid tanks to the second pressurized fluid conduit arrangement. Based on a subsequently determined pressure drop ($\Delta p$), the control arrangement determines whether said one of the primary and secondary fluid tanks is empty of liquefied fluid.

12 Claims, 5 Drawing Sheets

(58) Field of Classification Search
CPC ..... B60K 2015/03217; F17C 2221/033; F17C
2250/043; B60Y 2400/306
See application file for complete search history.

(56) References Cited

U.S. PATENT DOCUMENTS

| | | |
|---|---|---|
| 2016/0177857 A1 | 6/2016 | Sarikaya et al. |
| 2021/0041066 A1 | 2/2021 | Garner et al. |

FOREIGN PATENT DOCUMENTS

| | | | |
|---|---|---|---|
| CN | 109312674 | A | 2/2019 |
| DE | 102010053437 | A1 | 6/2012 |
| DE | 102018004050 | A1 | 12/2018 |
| DE | 102017213524 | A1 | 2/2019 |
| EP | 3470252 | A1 | 4/2019 |
| WO | 2017222451 | A1 | 12/2017 |
| WO | 2020091652 | A1 | 5/2020 |

OTHER PUBLICATIONS

Jun. 14, 2022—(WO) International Search Report & Written Opinion—App. No. PCT/SE2022/050530.
Apr. 3, 2018—(SE) Search Report—App. No. 2150772-8.
Feb. 2, 2022—(SE) Office Action—App. No. 2150772-8.

METHOD AND A CONTROL ARRANGEMENT FOR DETERMINING THE STATUS OF A FLUID TANK

CROSS-REFERENCE TO RELATED APPLICATIONS

The present application claims priority from and is a U.S. National Phase of International Application No. PCT/SE2022/050530, which was filed on Jun. 2, 2022, designating the United States of America and claiming priority to Swedish Patent Application No. 2150772-8, filed on Jun. 15, 2021. This application claims priority to and the benefit of the above-identified applications, which are all fully incorporated by reference herein in their entireties.

TECHNICAL FIELD

The present disclosure relates the technical field of determining a status of a fuel tank containing a fluid or a mixture of fluids available in liquefied form and vaporised form.

BACKGROUND

Today, vehicles which run on methane are produced. In general, the fuel supply system for methane is available in two different alternatives. According to the first alternative, the methane is provided as a compressed natural gas, CNG. According to the second alternative, the methane is provided as a liquefied natural gas, LNG. LNG has a higher density in relation to CNG and thus offers a longer vehicle driving range. In general, in a vehicle, for example in a truck or tractor, LNG is stored in one or more cryogenic containers or tanks. Often, two tanks are provided for LNG, one on each lateral side of the vehicle. Each of the two tanks holds or contain LNG in both liquid phase and vapour phase and holds in general between 10 and 16 bar of pressure, but the pressure can also be below 10 bar or above 16 bar. LNG may include some minor amount of another gas or other gases in addition to methane. Methane may be replaced by some other gas. LNG in vapour phase or may be called pressure head. In general, the pressure head is used to push out and supply the LNG from the tank to the engine of the vehicle. When filling a tank with LNG, a filling hose is connected to an inlet of the tank to supply LNG in liquid phase. In order to be able to push fuel into the tank, it may be needed to decrease the pressure prior to filling. To be able to ventilate the tank, a manually operated valve device of the tank may be manually opened by the user or driver to lower or balance the pressure of the tank. A ventilation hose may be connected to a ventilation connector of the tank, which in turn is connected the manually operated valve device, to guide LNG in vapour phase away from the tank and back to the filling station. When two or more tanks are provided in a vehicle, the tanks may be fluidly connected to the same ventilation connector via their open manually operated valve devices.

SUMMARY

When filling two or more tanks, for example present in a vehicle, with LNG in liquid phase, the manually operated valve devices should be opened manually by the operator or driver in order to ventilate the tanks and keep the pressure of the tanks at a level which allows filling. In general, the manually operated valve devices are connected to one and the same ventilation connector to which a ventilation hose is connected. Thus, when the manually operated valve devices are open, the thanks are in vapour communication with one another. The manually operated valve devices should be closed after the filling procedure. The inventors of the present invention have found that the manually operated valve devices are sometimes left open after the filling procedure and thus left open when driving the vehicle. The inventors of the present invention have found that the vapour communication between the tanks makes it difficult to determine the status of the tank.

An object of the invention is to provide a solution which mitigates or solves drawbacks and problems of conventional solutions.

The above and further objects are solved by the subject matter of the independent claims. Further advantageous embodiments of the invention can be found in the dependent claims.

According to a first aspect of the invention, a method for determining the status of a primary fluid tank or one or more secondary fluid tanks are provided. Each of the primary and secondary fluid tanks is arranged to contain a fluid or a mixture of fluids available in liquefied form and vaporised form, wherein the primary fluid and secondary fluid tanks are parts of a pressurized part of a fluid system, wherein each of the primary and secondary fluid tanks has a first intake line having an inlet located inside the fluid tank, the first intake line being part of the pressurized part, wherein the inlet of the first intake line is arranged to mainly receive a liquid of the fluid, wherein the primary and secondary fluid tanks are in vapour communication with one another via a first pressurized fluid conduit arrangement such that a vapour of the fluid can travel from one of the primary fluid tank and the secondary fluid tank to the other one of the primary fluid tank and the secondary fluid tank, the first pressurized fluid conduit arrangement being part of the pressurized part of the fluid system, wherein the first intake lines are arranged to be fluidly connected to a second pressurized fluid conduit arrangement and arranged to provide a fluid flow from the primary and secondary fluid tanks to the second pressurized fluid conduit arrangement, the second pressurized fluid conduit arrangement being part of the pressurized part of the fluid system, and wherein the fluid system comprises one or more sensors for determining one or more pressures of the fluid in the pressurized part. The method comprises:

determining, by usage of the sensor, one or more pressure drops associated with the fluid flow through the second pressurized fluid conduit arrangement;

when the pressure drop exceeds a threshold value, blocking the fluid flow from one of the primary and secondary fluid tanks to the second pressurized fluid conduit arrangement while the fluid flow from the other one of the primary and secondary fluid tanks to the second pressurized fluid conduit arrangement continues;

determining, by usage of the sensor, a pressure drop associated with the fluid flow through the second pressurized fluid conduit arrangement when the fluid flow from said one of the primary and secondary fluid tanks to the second pressurized fluid conduit arrangement is blocked while the fluid flow from the other one of the primary and secondary fluid tanks to the second pressurized fluid conduit arrangement continues. The method further comprises:

if the pressure drop returns to a value below the threshold value when the fluid flow from said one of the primary and secondary fluid tanks to the second pressurized fluid conduit arrangement is blocked, determining that said one of the primary and secondary fluid tanks is empty of liquefied fluid, or the method further comprises:

if the pressure drop remains above the threshold value when the fluid flow from said one of the primary and secondary fluid tanks to the second pressurized fluid conduit arrangement is blocked, blocking the fluid flow from the other one of the primary and secondary fluid tanks to the second pressurized fluid conduit arrangement while allowing the fluid flow from said one of the primary and secondary fluid tanks with the previously blocked fluid flow to the second pressurized fluid conduit arrangement;

determining, by usage of the sensor, a pressure drop associated with the fluid flow through the second pressurized fluid conduit arrangement when the fluid flow from the other one of the primary and secondary fluid tanks to the second pressurized fluid conduit arrangement is blocked while the fluid flow from said one of the primary and secondary fluid tanks with the previously blocked fluid flow to the second pressurized fluid conduit arrangement is allowed;

if the pressure drop remains above the threshold value when the fluid flow from the other one of the primary and secondary fluid tanks to the second pressurized fluid conduit arrangement is blocked, determining that the primary and secondary fluid tanks are empty of liquefied fluid;

if the pressure drop returns to a value below the threshold value when the fluid flow from the other one of the primary and secondary fluid tanks to the second pressurized fluid conduit arrangement is blocked, determining that the other one of the primary and secondary fluid tanks is empty of liquefied fluid.

The reason why the pressure drop exceeds the threshold value, for example because of a rapidly increased pressure reduction of the fluid in the second pressurized fluid conduit arrangement, is that the fluid tank which is empty of liquefied fluid starts to suck or pull vaporised fluid by means of the inlet of the first intake line and thus sucks more vaporised fluid from the other fluid tank via the first pressurized fluid conduit arrangement, which is providing a vapour communication between the primary fluid and secondary fluid tanks. The result is that the pressure drop may exceed the threshold value. In some systems, a rapidly increased pressure reduction of the fluid should be avoided and addressed when occurring, for example when a vehicle engine is involved. One response to counteract such a rapidly increased pressure reduction of the fluid can be to block the fluid flow from the fluid tank empty of liquefied fluid, whereby the pressure drop stabilizes or the pressure reduction rate is decreased. An advantage of the method according to the first aspect is that the blocking of the fluid flow from the fluid tank empty of liquefied fluid is part of the claimed method, and the fluid flow from the fluid tank determined empty may already be blocked when the determination is made.

In the present specification, determining that any one of the tanks is empty of liquified fuel includes determining that the tank is at least substantially empty of liquified fuel. That is, the liquid is at least below a level which can be considered to represent the tank being empty.

An advantage of the method according to the first aspect is that a procedure is provided which accurately determines the status of the fluid tank in an efficient manner. The status of the fluid tank may for example be "empty of liquefied fluid" or "not empty of liquefied fluid". In some fluid tanks there is a liquid level sensor which measures the liquid level of the liquefied fluid. However, such a liquid level sensor may not accurately give the liquid level of the liquefied fluid in the fluid tank, for example when a vehicle, which may carry the fluid tanks, travels downhill or uphill a slope. For example, when the vehicle travels downhill, the liquid level sensor may show that there is a relevant amount of liquefied fluid in the fluid tank despite the fact that the inlet of the first intake line is not in contact with the liquefied fluid.

By means of the method according to the first aspect, the user or operator does not have to close one or more of the manual valve devices, which should be open during the filling procedure, after filling the primary and secondary fluid tanks and when for example driving a vehicle provided with the primary and secondary fluid tanks, since the innovative method can determine whether the tank is empty or not even if the manual valve devices are left open. This simplifies the filling procedure. Since it is assumed according to the method of the first aspect that the manual valve devices are left open, erroneous indications from the liquid level sensors can be disregarded, whereby it is avoided that the user or driver operates the control system of a vehicle in an erroneous way.

Each of the above- and below-mentioned one or more sensors for determining one or more pressures of the fluid in the pressurized part may be a sensor arranged to determine one or more pressures of the fluid in the second pressurized fluid conduit arrangement.

According to an advantageous embodiment of the method according to the first aspect, each of the primary and secondary fluid tanks comprises a liquid level sensor for determining the height of the liquefied fluid inside the fluid tank, wherein the first step of blocking the fluid flow from one of the primary and secondary fluid tanks to the second pressurized fluid conduit arrangement when the pressure drop exceeds the threshold value comprises blocking the fluid flow from the one of the primary and secondary fluid tanks, which has the lowest height of liquefied fluid determined by the liquid level sensor in relation to the height of the liquefied fluid inside the other one of the primary and secondary fluid tanks, to the second pressurized fluid conduit arrangement while the fluid flow from the other one of the primary and secondary fluid tanks continues. An advantage of this embodiment is that the procedure for determining the status of the fluid tank is further improved, since it is guessed according to this embodiment of the method that the fluid tank showing the lowest height of liquefied fluid is the fluid tank that is empty. Alternatively, the fluid flow from the one of the primary and secondary fluid tanks, which has the highest height of liquefied fluid determined by the liquid level sensor in relation to the height of the liquefied fluid inside the other one of the primary and secondary fluid tanks, to the second pressurized fluid conduit arrangement is blocked while the fluid flow from the other one of the primary and secondary fluid tanks continues.

According to a further advantageous embodiment of the method according to the first aspect, the method comprises comparing the determined pressure drop with the threshold value. An advantage of this embodiment is that the procedure for determining the status of the fluid tank is further improved.

According to another advantageous embodiment of the method according to the first aspect, the sensor comprises a pressure sensor for measuring the pressure of the fluid in in the pressurized part, wherein the step of determining the pressure drop associated with the fluid flow through the second pressurized fluid conduit arrangement includes measuring the pressure drop by usage of the pressure sensor. An advantage of this embodiment is that the procedure for determining the status of the fluid tank is further improved. The sensor may comprise a pressure sensor for measuring the pressure of the fluid in the second pressurized fluid conduit arrangement.

According to yet another advantageous embodiment of the method according to the first aspect, the threshold value is a predetermined threshold value. An advantage of this embodiment is that the procedure for determining the status of the fluid tank is further improved.

According to still another advantageous embodiment of the method according to the first aspect, the fluid comprises a fuel. An advantage of this embodiment is that the procedure for determining the status of a fuel tank is improved.

According to an advantageous embodiment of the method according to the first aspect, the fluid comprises a liquefied natural gas, LNG, for example methane. The LNG may be present or available in liquid and/or vapour form. An advantage of this embodiment is that the procedure for determining the status of an LNG tank is improved. LNG may include some minor amount of another gas or other gases in addition to methane.

According to a second aspect of the invention, the above mentioned and other objects are achieved with a computer program comprising instructions which, when the program is executed by a computer, cause the computer to carry out the method according to any one of the embodiments disclosed above or below. The advantages of the computer program according to the second aspect correspond to the above- or below-mentioned advantages of the method according to the first aspect and its embodiments.

According to a third aspect of the invention, the above mentioned and other objects are achieved with a computer-readable medium comprising instructions which, when the instructions are executed by a computer, cause the computer to carry out the method according to any one of the embodiments disclosed above or below. The advantages of the computer-readable medium according to the third aspect correspond to the above- or below-mentioned advantages of the method according to the first aspect and its embodiments.

According to an aspect of the present invention, the above-mentioned computer program and computer-readable medium are configured to implement the method and its embodiments described herein.

According to a fourth aspect of the invention, the above mentioned and other objects are achieved with a control arrangement for determining the status of a primary fluid tank or one or more secondary fluid tanks, each of the primary and secondary fluid tanks being arranged to contain a fluid or a mixture of fluids available in liquefied form and vaporised form, wherein the primary fluid and secondary fluid tanks are parts of a pressurized part of a fluid system, wherein each of the primary and secondary fluid tanks has a first intake line having an inlet located inside the fluid tank, the first intake line being part of the pressurized part, wherein the inlet of the first intake line is arranged to mainly receive a liquid of the fluid, wherein the primary and secondary fluid tanks are arranged to be in vapour communication with a ventilation connector via a first pressurized fluid conduit arrangement such that a vapour of the fluid can travel from one of the primary fluid tank and the secondary fluid tank to the other one of the primary fluid tank and the secondary fluid tank, the first pressurized fluid conduit arrangement being part of the pressurized part of the fluid system, wherein the first intake lines are arranged to be fluidly connected to a second pressurized fluid conduit arrangement and are arranged to provide a fluid flow from the primary and secondary fluid tanks to the second pressurized fluid conduit arrangement, the second pressurized fluid conduit arrangement being part of the pressurized part of the fluid system, wherein the fluid system comprises one or more sensors for determining one or more pressures of the fluid in the pressurized part, wherein the control arrangement is configured to:

determine, by usage of the sensor, one or more pressure drops associated with the fluid flow through the second pressurized fluid conduit arrangement, when the pressure drop exceeds a threshold value, block the fluid flow from one of the primary and secondary fluid tanks to the second pressurized fluid conduit arrangement while the fluid flow from the other one of the primary and secondary fluid tanks to the second pressurized fluid conduit arrangement continues, if the pressure drop returns to a value below the threshold value when the fluid flow from said one of the primary and secondary fluid tanks to the second pressurized fluid conduit arrangement is blocked, determine that said one of the primary and secondary fluid tanks is substantially empty of liquefied fluid, if the pressure drop remains above the threshold value when the fluid flow from said one of the primary and secondary fluid tanks to the second pressurized fluid conduit arrangement is blocked, block the fluid flow from the other one of the primary and secondary fluid tanks to the second pressurized fluid conduit arrangement while allowing the fluid flow from said one of the primary and secondary fluid tanks with the previously blocked fluid flow to the second pressurized fluid conduit arrangement, if the pressure drop remains above the threshold value when the fluid flow from the other one of the primary and secondary fluid tanks to the second pressurized fluid conduit arrangement is blocked, determine that the primary and secondary fluid tanks are substantially empty of liquefied fluid, and if the pressure drop returns to a value below the threshold value when the fluid flow from the other one of the primary and secondary fluid tanks to the second pressurized fluid conduit arrangement is blocked, determine that the other one of the primary and secondary fluid tanks is substantially empty of liquefied fluid.

The advantages of the control arrangement according to the fourth aspect correspond to the above- or below-mentioned advantages of the method according to the first aspect and its embodiments.

According to an advantageous embodiment of the control arrangement according to the fourth aspect, the control arrangement is configured to compare the determined pressure drop with the threshold value.

According to a fifth aspect of the invention, the above mentioned and other objects are achieved with a fluid system comprising a pressurized part, the pressurized part comprising a primary fluid tank arranged to contain a fluid or a mixture of fluids available in liquefied form and vaporised form, one or more secondary fluid tanks arranged to contain a fluid or a mixture of fluids available in liquefied form and vaporised form, wherein each of the primary and secondary fluid tanks has a first intake line having an inlet located inside the fluid tank, the first intake line being part of the pressurized part, wherein the inlet of the first intake line is arranged to mainly receive a liquid of the fluid, a first pressurized fluid conduit arrangement arranged to fluidly connect the primary and secondary fluid tanks with a ventilation connector of the first pressurized fluid conduit arrangement, whereby a vapour communication between the primary and secondary fluid tanks is provided such that a vapour of the fluid can travel from one of the primary fluid tank and the secondary fluid tank to the other one of the primary fluid tank and the secondary fluid tank, and a second pressurized fluid conduit arrangement arranged to be fluidly connected to the first intake lines, wherein the first intake lines are arranged to provide a fluid flow from the primary and secondary fluid tanks to the second pressurized fluid conduit arrangement, wherein the fluid system comprises one or more sensors for determining one or more pressures of the fluid in the pressurized part, and wherein the fluid system comprises a control arrangement according to any one of the above- or below-mentioned embodiments.

The advantages of the fluid system according to the fifth aspect correspond to the above- or below-mentioned advantages of the method according to the first aspect and its embodiments.

According to an advantageous embodiment of the fluid system according to the fifth aspect, the pressurized part of the fluid system comprises a primary valve arrangement, wherein the first intake line of the primary fluid tank and the second pressurized fluid conduit arrangement are arranged to be fluidly connected with one another via the primary valve arrangement, wherein the primary valve arrangement is arranged to block the fluid flow from the primary fluid tank to the second pressurized fluid conduit arrangement, and wherein the control arrangement is configured to control the fluid from the primary fluid tank by controlling the primary valve arrangement. An advantage of this embodiment is that the procedure for determining the status of the fluid tank is further improved.

According to a further advantageous embodiment of the fluid system according to the fifth aspect, the pressurized part of the fluid system comprises a secondary valve arrangement, wherein the first intake line of the secondary fluid tank and the second pressurized fluid conduit arrangement are arranged to be fluidly connected with one another via the secondary valve arrangement, wherein the secondary valve arrangement is arranged to block the fluid flow from the secondary fluid tank to the second pressurized fluid conduit arrangement, and wherein the control arrangement is configured to control the fluid from the secondary fluid tank by controlling the secondary valve arrangement. An advantage of this embodiment is that the procedure for determining the status of the fluid tank is further improved.

According to another advantageous embodiment of the fluid system according to the fifth aspect, each of the primary and secondary fluid tanks has a ventilation outlet arranged to be fluidly connected to the first pressurized fluid conduit arrangement, wherein when the primary fluid tank is installed, the inlet of the first intake line of the primary fluid tank is located at a level below the ventilation outlet of the primary fluid tank, and wherein when the secondary fluid tank is installed, the inlet of the first intake line of each secondary fluid tank is located at a level below the ventilation outlet of the secondary fluid tank.

According to still another advantageous embodiment of the fluid system according to the fifth aspect, the first pressurized fluid conduit arrangement comprises a primary valve device and a secondary valve device, each of the primary and secondary valve devices being arranged to be manually operated, and wherein the ventilation outlet of the primary fluid tank is fluidly connectable to the ventilation outlet of the secondary fluid tank via the primary and secondary valve devices.

According to yet another advantageous embodiment of the fluid system according to the fifth aspect, each of the primary and secondary fluid tanks has a second intake line having an inlet located inside the fluid tank, the second intake line being part of the pressurized part, wherein the inlet of the second intake line is arranged to receive a vapour of the fluid, wherein the second intake lines are arranged to provide a vaporised fluid flow from the primary and secondary fluid tanks to the second pressurized fluid conduit arrangement, wherein when the primary fluid tank is installed, the inlet of the first intake line of the primary fluid tank is located at a level below the inlet of the second intake line of the primary fluid tank, and wherein when the secondary fluid tank is installed, the inlet of the first intake line of the secondary fluid tank is located at a level below the inlet of the second intake line of the secondary fluid tank.

According to an advantageous embodiment of the fluid system according to the fifth aspect, the second intake line of the primary fluid tank and the second pressurized fluid conduit arrangement are fluidly connectable to one another via the primary valve arrangement, wherein the primary valve arrangement is arranged to block the fluid flow from the first and/or second intake lines of the primary fluid tank to the second pressurized fluid conduit arrangement.

According to a further advantageous embodiment of the fluid system according to the fifth aspect, each of the primary and secondary fluid tanks comprises a liquid level sensor for determining the height of the liquefied fluid inside the fluid tank, wherein when the pressure drop exceeds the threshold value, the control arrangement is arranged to block the fluid flow from the one of the primary and secondary fluid tanks, which has the lowest height of liquefied fluid determined by the liquid level sensor in relation to the height of the liquefied fluid inside the other one of the primary and secondary fluid tanks, to the second pressurized fluid conduit arrangement while the fluid flow from the other one of the primary and secondary fluid tanks continues.

According to another advantageous embodiment of the fluid system according to the fifth aspect, the sensor comprises a pressure sensor for measuring the pressure of the fluid in the pressurized part, wherein the control arrangement is configured to determine the pressure drop associated with the fluid flow through the second pressurized fluid conduit arrangement by measuring the pressure drop by usage of the pressure sensor. An advantage of this embodiment is that the procedure of determining the status of the fluid tank is further improved. The sensor may comprise a pressure sensor for measuring the pressure of the fluid in the second pressurized fluid conduit arrangement.

According to still another advantageous embodiment of the fluid system according to the fifth aspect, each of the primary and secondary fluid tanks is arranged to contain a fluid in the form of fuel.

According to yet another advantageous embodiment of the fluid system according to the fifth aspect, each of the primary and secondary fluid tanks is arranged to contain a fluid in the form of a liquefied natural gas, LNG, for example methane.

It will be appreciated that all the embodiments described for the method aspects of the invention are applicable also to at least one of the control arrangement aspects and the fluid system aspects of the invention. Thus, all embodiments described for the method aspects of the invention may be performed by the control arrangement, which may include a control unit or control device, or by the fluid system. As mentioned above, the control arrangement and its embodiments and the fluid system and its embodiments have advantages corresponding to the advantages mentioned above for the method and its embodiments.

According to a sixth aspect of the invention, the above mentioned and other objects are achieved with a vehicle comprising the fluid system according to any one of the above- or below-mentioned embodiments. The vehicle may comprise a combustion engine, wherein the second pressurized fluid conduit arrangement is arranged to be fluidly connected to the combustion engine.

The above-mentioned features and embodiments of the method, the computer program, the computer-readable medium, the control arrangement, the fluid system and the vehicle, respectively, may be combined in various possible ways providing further advantageous embodiments.

Further advantageous embodiments of the method, the computer program, the computer-readable medium, the control arrangement, the fluid system and the vehicle according to the present invention and further advantages with the embodiments of the present invention emerge from the dependent claims and the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 1:
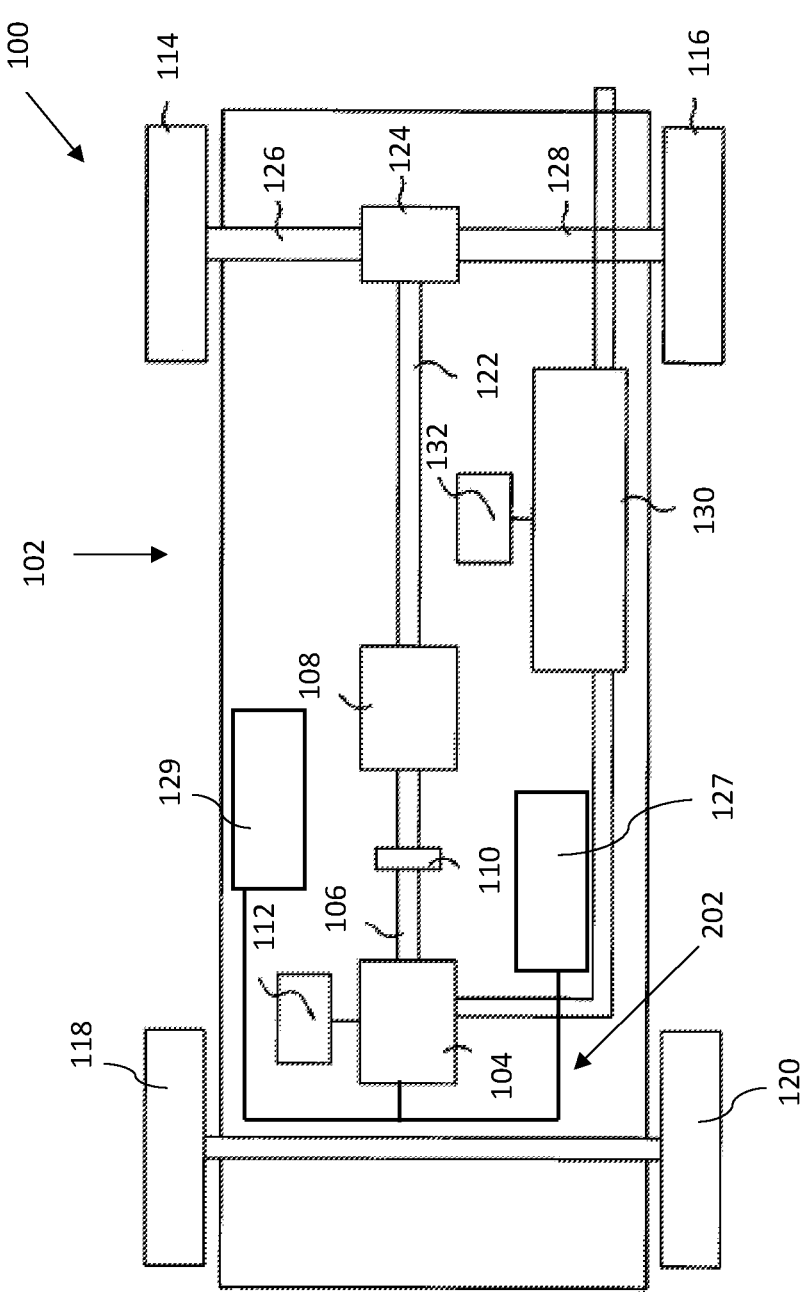
FIG. 1 is a schematic view illustrating a vehicle according to the sixth aspect of the invention, in which embodiments of the present invention may be implemented.

With reference to FIG. 1, a vehicle 100 is schematically shown. The vehicle 100 may be called a motor vehicle 100. The vehicle 100 may be a tractor or truck, for example a heavy truck, which may carry a trailer. The vehicle 100 comprises a powertrain 102, which comprises a combustion engine 104, for example an internal combustion engine or other combustion engine, which in a conventional manner, via a first output shaft 106 and usually via a flywheel, is connected to a gearbox 108 via a clutch 110. In general, the combustion engine 104 comprises cylinders. In addition to the powertrain 102 comprising a combustion engine 104, the vehicle 100 may include one or more electrical machines for driving drive wheels 114, 116, 118, 120 of the vehicle 100 and may thus for example be a so-called hybrid vehicle.

The combustion engine 104 may be controlled by the engine's control system via a control device 112. Likewise, the clutch 110 and the gearbox 108 may be controlled by the engine's control system, with the help of one or more control devices (not shown). The engine's control system and the control device 112 and/or another control device may thus be configured to control the combustion engine 104, the clutch 110, the gearbox 108, and/or any other units/devices/entities of the vehicle 100. However, in FIG. 1, only a few of the units/devices/entities of the vehicle 100 are illustrated.

Naturally, the powertrain 102 of the vehicle 100 may be of a different type, such as a type with a conventional automatic gearbox or manual gearbox, a type with a hybrid driveline etc. As mentioned above, the powertrain 102 may for example include one or more electrical machines for driving drive wheels 114, 116, 118, 120 of the vehicle 100, implementing a so-called hybrid drive. The vehicle 100 may comprise four wheels 114, 116, 118, 120, or more than four wheels 114, 116, 118, 120. The above-mentioned electrical machine may be arranged essentially anywhere, as long as torque is provided to one or more of the wheels 114, 116, 118, 120, for example adjacent to one or more of the wheels 114, 116, 118, 120, as is understood by a skilled person. The vehicle 100 may comprise a propeller shaft 122 from the gearbox 108 which drives two of the wheels 114, 116 via a central gear 124, for example a conventional differential, and two drive shafts 126, 128 of the vehicle 100. The two drive shafts 126, 128 are connected to the central gear 124. The vehicle 100 may include more than two drive wheels 114, 116.

The vehicle 100 includes a primary fluid tank 127 and one or more secondary fluid tanks 129. In the shown embodiment, the vehicle 100 comprises one secondary fluid tank 129. However, the vehicle 100 may include a plurality, i.e. two or more, of secondary fluid tanks. The primary fluid tank 127 may be mounted at one lateral side of the vehicle 100 while the secondary fluid tank 129 is mounted at the other lateral side of the vehicle 100. However, it is to be understood that the fluid tanks 127, 129 may be located at several other possible positions. The primary fluid tank 127 and the secondary fluid tank 129 may for example switch places with one another. Further, the fluid tanks 127, 129 may for example be located on the same lateral side of the vehicle, for example after one another in direction of the longitudinal extension of the vehicle 100, or at other positions. Each tank 127, 129 is arranged to contain or hold a fluid or a mixture of fluids. Each tank 127, 129 is arranged to contain or hold a fluid in liquefied and/or vaporised form. Thus, it is to be understood that the fluid can be a liquid or a vapour (gas) or a mixture thereof.

In the shown embodiment, the primary fluid tank 127 is a primary fuel tank 127, and each secondary fluid tank 129 is a secondary fuel tank 129. Thus, each of the primary and secondary fluid tanks 127, 129 is arranged to contain a fluid in the form of fuel. Each fluid tank 127, 129 may be arranged to contain or hold a fluid in the form of a liquefied natural gas, LNG, for example methane. Each fluid tank 127, 129 may be a cryogenic fluid tank and arranged to store liquefied LNG at approximately −120° C., or lower, for example approximately −160° C., inside the fluid tank 127, 129. When the liquefied LNG absorbs heat from the surroundings, the liquefied LNG vaporises, and the pressure of the LNG fluid increases. It is preferred to keep the LNG in liquid form in the fluid tanks 127, 129. Therefore, the fluid tanks 127, 129 are preferably thermally insulated. Each fluid tank 127, 129 may define a compartment for holding the fluid. Each fluid tank 127, 129 may include an inner vessel having said compartment and an outer vessel enclosing or surrounding the inner vessel, wherein thermal insulation may be provided between the inner vessel and the outer vessel, for example vacuum. LNG may include some minor amount of another gas or other gases in addition to methane. Other gases instead of methane may be used.

LNG may be present in liquid and/or vapour form. When liquid-phase LNG is present in a fluid tanks 127, 129, there will also be an amount of vaporised LNG. The vaporised LNG, or the LNG in gas or vapour phase or the gas-phase LNG, in the fluid tank 127, 129 may be called pressure head. The pressure head makes it possible to push or press out the liquid-phase LNG from the fluid tank 127, 129 to the combustion engine 104. Thus, the combustion engine 104 may be provided with fuel from the primary and secondary fluid tanks 127, 129 coupled to the combustion engine 104. LNG is known to the person skilled in the art and thus not discussed in more detail.

With reference to FIG. 1, the vehicle 100 includes a fluid system 202, for example in the form of a fuel system, including a pressurized part 204, wherein the pressurized part 204 includes the primary and secondary fluid tanks 127, 129.

The vehicle 100 may comprise an exhaust gas after-treatment system 130, which also may be called an exhaust gas purification system, for treatment/purification of the exhaust gas/emissions resulting from the combustion in the combustion chamber of the combustion engine 104. The exhaust gas after-treatment system 130 may be controlled by an exhaust gas after-treatment control device 132, which may communicate with the control device 112 or another device of the engine's control system.

Figure 2:
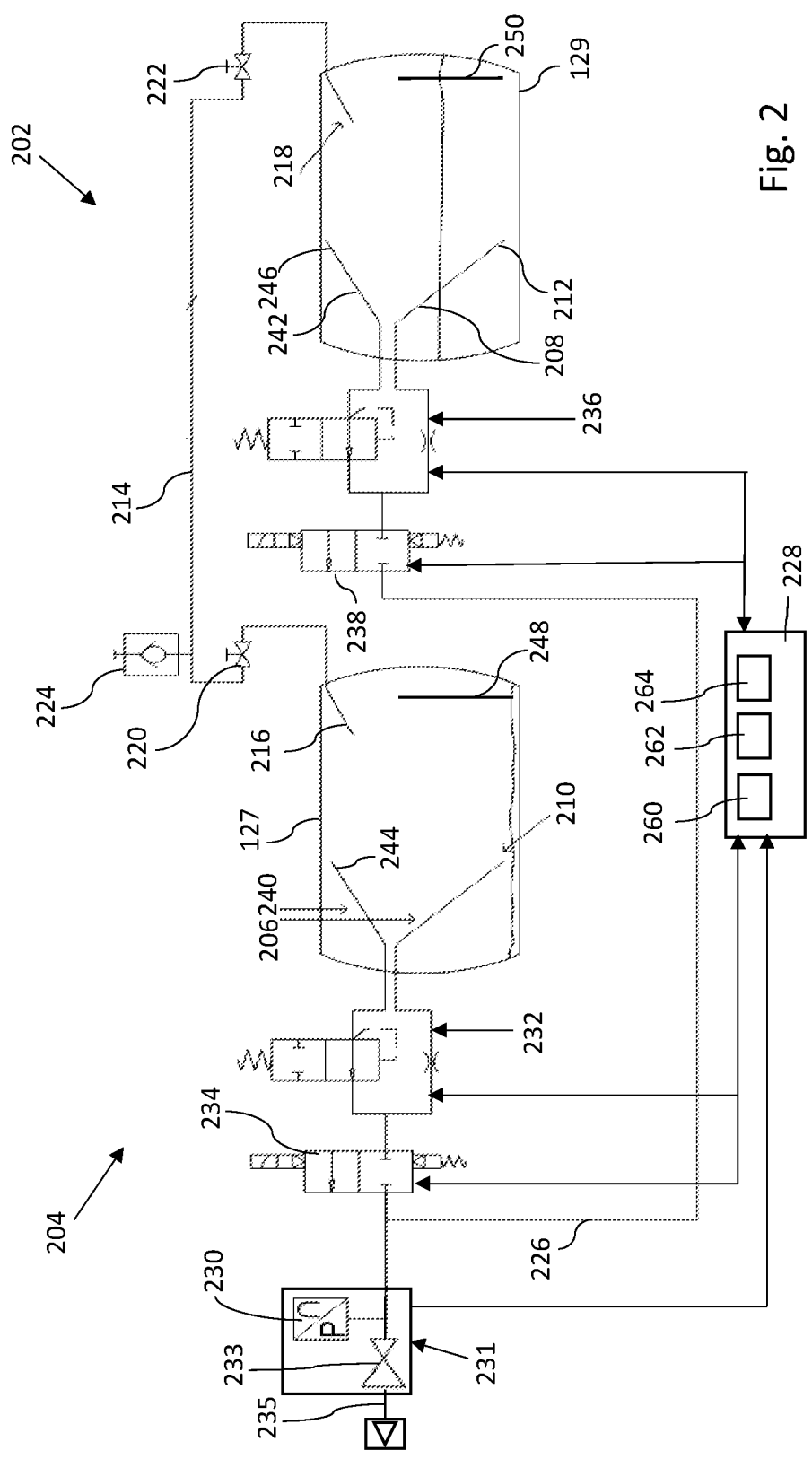
FIG. 2 is a schematic diagram illustrating embodiments of the fluid system according to the fifth aspect of the invention.

With reference to FIG. 2, an embodiment of the fluid system 202 according to the according to the fifth aspect of the invention is schematically illustrated. The fluid system 202 may be applied to or mounted to a vehicle 100. The fluid system 202 includes a pressurized part 204. The pressurized part 204 includes a primary fluid tank 127 arranged to contain a fluid available, or present, in liquefied form and vaporised form or a mixture of fluids available in liquefied form and vaporised form. The pressurized part 204 includes one or more secondary fluid tanks 129 arranged to contain a fluid available in liquefied form and vaporised form or a mixture of fluids available in liquefied form and vaporised form. In the shown embodiment, only one secondary fluid tank 129 is provided, but the fluid system 202 could include a plurality of secondary fluid tanks 129, i.e. two or more secondary fluid tanks 129. In the shown embodiment, each of the primary and secondary fluid tanks 127, 129 may be arranged to contain a fluid in the form of fuel. Advantageously, each of the primary and secondary fluid tanks 127, 129 is arranged to contain a fluid in the form of a liquefied natural gas, LNG, for example methane. In the shown embodiment, each of the primary and secondary fluid tanks 127, 129 is arranged to contain LNG in liquefied form and vaporised form, for example methane in liquefied form and vaporised form. The primary fluid tank 129 may be called a first fluid tank 127, and the secondary fluid tank 129 may be called a second fluid tank 129. Each fluid tank 127, 129 may for example be a container.

Each of the primary and secondary fluid tanks 127, 129 has a first intake line 206, 208. Each first intake line 206, 208 has an inlet 210, 212 located inside the fluid tank 127, 129. Each first intake line 206, 208 is part of the pressurized part 204. The inlet 210, 212 of the first intake line 206, 208 is arranged to mainly receive, or take in or pull, a liquid of the fluid, for example LNG in liquefied form in the shown embodiment. Each of the first intake lines 206, 208 may be a conduit. Each of the first intake lines 206, 208 is arranged to convey a fluid.

The pressurized part 204 includes a first pressurized fluid conduit arrangement 214 arranged to fluidly connect the primary and secondary fluid tanks 127, 129 with a ventilation connector 224 of the first pressurized fluid conduit arrangement 214, whereby a vapour communication between the primary and secondary fluid tanks 127, 129 is provided, such that a vapour of the fluid can travel from one of the primary fluid tank 127 and the secondary fluid tank 129 to the other one of the primary fluid tank 127 and the secondary fluid 129, for example travel between the primary fluid tank 127 and the secondary fluid tank 129. The first pressurized fluid conduit arrangement 214 is arranged to convey a fluid.

The fact that two entities are fluidly connected to another means in the context of the present disclosure that there is a fluid connection between the two entities such that a fluid can travel between the two entities.

Each of the primary and secondary fluid tanks 127, 129 may have a ventilation outlet 216, 218 arranged to be fluidly connected to the first pressurized fluid conduit arrangement 214. When the primary fluid tank 127 is installed, the inlet 210 of the first intake line 206 of the primary fluid tank 127 is located at a level below the ventilation outlet 216 of the primary fluid tank 127. When the secondary fluid tank 129 is installed, the inlet 212 of the first intake line 208 of each secondary fluid tank 129 is located at a level below the ventilation outlet 218 of the secondary fluid tank 129.

The first pressurized fluid conduit arrangement 214 may include a primary valve device 220 and a secondary valve device 222. Each of the primary and secondary valve devices 220, 222 may be arranged to be manually operated. Since the primary fluid tank 127 and the secondary fluid tank 129 are both fluidly connected to the ventilation connector 224, the ventilation outlet 216 of the primary fluid tank 127 is fluidly connectable to the ventilation outlet 218 of the secondary fluid tank 129 via the primary and secondary valve devices 220, 222. The first pressurized fluid conduit arrangement 214 may include the ventilation connector 224 as mentioned above. The ventilation connector 224 may include a valve. The ventilation connector 224 may be fluidly connected to the primary and secondary valve devices 220, 222.

As mentioned above, when the primary and secondary fluid tanks 127, 129 are mounted to a vehicle 100 to supply the fluid, such as the fuel, for example LNG, to an engine 104 of the vehicle 100, for example, and when the primary and secondary fluid tanks 127, 129 are being filled with LNG in liquefied form at a filling station, the user or operator may open the primary and secondary valve devices 220, 222 manually in order to ventilate the primary and secondary fluid tanks 127, 129 via the ventilation connector 224 and keep the pressure of the primary and secondary fluid tanks 127, 129 at a level which allows filling of the primary and secondary fluid tanks 127, 129 with the LNG in liquefied form. In general, the primary and secondary valve devices 220, 222 are opened manually before starting the filling of the primary and secondary fluid tanks 127, 129 with the liquefied fluid or LNG.

In general, during the filling process, the manually operated primary and secondary valve devices 220, 222, which are connected to one and the same ventilation connector 224, are opened, and a ventilation hose may be connected to the ventilation connector 224 to guide LNG in vaporised form away from the primary and secondary fluid tanks 127, 129 back to the filling station and thus lower or balance the pressure of the fluid in the primary and secondary fluid tanks 127, 129, and/or keep the pressure of the fluid in the primary and secondary fluid tanks 127, 129 at a sufficiently low level, in order to facilitate the filling of the primary and secondary fluid tanks 127, 129 with liquefied fluid or LNG. Otherwise, LNG in vaporised form in the secondary fluid tanks 127, 129 could prevent the filling of the primary and secondary fluid tanks 127, 129. When the manually operated primary and secondary valve devices 220, 222 are open, the primary and secondary fluid tanks 127, 129 are in vapour communication with one another, i.e. a vapour can travel from one of the primary and secondary fluid tanks 127, 129 to the other one of the primary and secondary fluid tanks 127, 129, for example between the primary and secondary fluid tanks 127, 129.

In general and according to user instructions, the manually operated primary and secondary valve devices 220, 222, or at least one of the primary and secondary valve devices 220, 222, should preferably be closed after the filling procedure. If both of the manually operated primary and secondary valve devices 220, 222 instead are left open after filling and during driving the vehicle 100, LNG in vaporised form can travel from one of the primary and secondary fluid tanks 127, 129 to the other one of the primary and secondary fluid tanks 127, 129, for example between the primary and secondary fluid tanks 127, 129. As a result, when the liquid level of one of the primary and secondary fluid tanks 127, 129 becomes so low such that the inlet 210, 212 of the relevant first intake line 206, 208 cannot take in or receive liquefied fluid, i.e. the inlet 210, 212 of the relevant first intake line 206, 208 is above the level of liquefied fluid when the primary and secondary fluid tanks 127, 129 are installed, the inlet 210, 212 of the relevant first intake line 206, 208 will take in or receive fluid in vaporised form and more vaporized fluid will be sucked into the substantially empty fluid tank 127, 129 of the primary and secondary fluid tanks 127, 129 from the other one 127, 129 of the primary and secondary fluid tanks 127, 129. This results in a rapidly increased pressure reduction of the fluid in the pressurized part 204 of the fluid system 202. Such an increased pressure reduction is unwanted since a certain pressure of the pressurized part 204 is required. The pressurized part 204 of the fluid system should supply fluid at a sufficient pressure level, for example to an engine 104 of a vehicle 100. A response to such a rapidly increased pressure reduction of the fluid in the pressurized part 204 could be to close or block the fluid flow from the substantially empty fluid tank 127, 129 of the primary and secondary fluid tanks 127, 129. A liquid level sensor 248, 250 for determining the height of the liquefied fluid inside the fluid tank 127, 129 could indicate which one of the primary and secondary fluid tanks 127, 129 is the substantially empty fluid tank 127, 129. However, such a liquid level sensor 248, 250 may not accurately give the liquid level of the liquefied fluid in the primary and secondary fluid tanks 127, 129 for several reasons, one of which being disclosed hereinafter. Further, the liquid level sensor 248, 250 may not be sufficiently calibrated and thus unreliable.

If the primary and secondary valve devices 220, 222, or at least one of the primary and secondary valve devices 220, 222, instead were closed when driving the vehicle 100, the fluid tank 127, 129 of the primary and secondary fluid tanks 127, 129, which first would become substantially empty, would not suck vaporized fluid from the other one 127, 129 of the primary and secondary fluid tanks 127, 129, and thus a rapidly increased pressure reduction of the fluid in the pressurized part 204 would not occur, and the pressure decrease of the fluid in the pressurized part 204 would be maintained at an acceptable level or rate in order to deliver the pressurized fluid to the engine 104 of the vehicle 100, for example. However, as a result of the embodiments of the present invention, the user or driver can leave the manually operated primary and secondary valve devices 220, 222 open during driving, which is disclosed in more detail hereinbelow.

"Substantially empty of liquefied fluid", such as "substantially empty of liquefied LNG", in the context of the present disclosure means that the fluid tank 127, 129 is in principal empty, but that there may be a minor amount of liquefied fluid/LNG at the bottom of the fluid tank 127, 129, which is not reached by the inlet 210, 212 of the first intake line 206, 208, i.e. an irrelevant amount of liquefied fluid/LNG may be present in the fluid tank 127, 129. "Empty of liquefied fluid/LNG" may be expressed as empty of a liquid of the fluid/LNG, or as empty of a relevant amount of liquefied fluid. In a fluid tank 127, 129 which is substantially empty of liquefied fluid/LNG, there may still be fluid/LNG in vaporised form.

Further, the pressurized part 204 includes a second pressurized fluid conduit arrangement 226 arranged to be fluidly connected to the first intake lines 206, 208. The first intake lines 206, 208 are arranged to provide a fluid flow, mainly a liquefied fluid flow, from the primary and secondary fluid tanks 127, 129 to the second pressurized fluid conduit arrangement 226. In the shown embodiment, where the fluid system 202 is associated with a vehicle 100 including a combustion engine 104, the second pressurized fluid conduit arrangement 226 is arranged to be fluidly connected to the combustion engine 104 to provide the combustion engine 104 with fuel in the form of LNG. The second pressurized fluid conduit arrangement 226 is arranged to convey a fluid.

The fluid system 202 includes a control arrangement 228 for determining the status of a primary fluid tank 127 or one or more secondary fluid tanks 129. The status of each tank 127, 129 may be "empty of liquefied fluid" or "not empty of liquefied fluid". The control arrangement 228 may be arranged to communicate with the control device 112 or another device of the engine's control system. The control arrangement 228 is disclosed in more detail hereinbelow.

The fluid system 202 includes one or more sensors, for example one sensor 230, for determining one or more pressures p of the fluid in the pressurized part 204. Each of the above- and below-mentioned one 230 or more sensors 230 for determining one or more pressures of the fluid in the pressurized part 204 may be a sensor arranged to determine one or more pressures of the fluid in the second pressurized fluid conduit arrangement 226. The sensor 230 may comprise a pressure sensor for measuring the pressure p of the fluid in the pressurized part 204. The sensor 230 may comprise a pressure sensor for measuring the pressure p of the fluid in second pressurized fluid conduit arrangement 226. The control arrangement 228 is configured to determine, by usage of the sensor 230, one or more pressure drops Δp associated with the fluid flow through the second pressurized fluid conduit arrangement 226. The pressure drop Δp may be a pressure decrease rate, for example with the unit bars per second. The sensor 230 may be located in the pressurized part 204, for example in the second pressurized fluid conduit arrangement 226.

The control arrangement 228 may be configured to determine a pressure drop Δp associated with the fluid flow through the second pressurized fluid conduit arrangement 226 by measuring the pressure drop Δp by usage of the pressure sensor. The reason for determining said pressure drop Δp is disclosed hereinbelow. Alternatively, another value for a pressure-related variable associated with the pressure of the fluid in the pressurized part 204 or in the second pressurized fluid conduit arrangement 226, could be determined or measured, and based thereupon the pressure of the fluid in the second pressurized fluid conduit arrangement 226 or in the pressurized part 204 could be determined. The sensor 230 may be part of a regulator unit 231 including the sensor 230 and a regulator 233. The regulator 233 may separate the pressurized part 204 from a low-pressure fuel system 235 which in turn is fluidly connected or connectable to the engine 104 of the vehicle 100. However, the sensor 230 could be a separate unit separate from the regulator unit 231.

The pressurized part 204 of the fluid system 202 includes a primary valve arrangement 232. The first intake line 206 of the primary fluid tank 127 and the second pressurized fluid conduit arrangement 226 may be arranged to be fluidly connected with one another via the primary valve arrangement 232. The primary valve arrangement 232 may include an economiser. An economiser per se is known to the skilled person and thus not disclosed in further detail. The primary valve arrangement 232 may be arranged to block the fluid flow from the primary fluid tank 127 to the second pressurized fluid conduit arrangement 226. The primary valve arrangement 232 may also be arranged to allow the fluid flow from the primary fluid tank 127 to the second pressurized fluid conduit arrangement 226. The control arrangement 228 may be configured to control the fluid from the primary fluid tank 127 by controlling the primary valve arrangement 232.

Further, the pressurized part 204 of the fluid system 202 may include a primary automatic shut-off valve 234. The primary automatic shut-off valve 234 may be included in the primary valve arrangement 232. Thus, the primary valve arrangement 232 may comprise the primary automatic shut-off valve 234. The first intake line 206 of the primary fluid tank 127 and the second pressurized fluid conduit arrangement 226 may be arranged to be fluidly connected with one another via the primary automatic shut-off valve 234. The control arrangement 228 may be configured to close the primary automatic shut-off valve 234 when the vehicle 100 is turned or powered off or when the vehicle 100 experiences an accident. An automatic shut-off valve 234 per se used in vehicles 100 is known to the skilled person and thus not disclosed in further detail. The control arrangement 228 may be configured to control the fluid from the primary fluid tank 127 by controlling the primary automatic shut-off valve 234.

The pressurized part 204 of the fluid system 202 comprises a secondary valve arrangement 236. The first intake line 208 of the secondary fluid tank 129 and the second pressurized fluid conduit arrangement 226 may be arranged to be fluidly connected with one another via the secondary valve arrangement 236. The secondary valve arrangement 236 may include an economiser. The secondary valve arrangement 236 may be arranged to block the fluid flow from the secondary fluid tank 129 to the second pressurized fluid conduit arrangement 226. The secondary valve arrangement 236 may also be arranged to allow the fluid flow from the secondary fluid tank 129 to the second pressurized fluid conduit arrangement 226. The control arrangement 228 may be configured to control the fluid from the secondary fluid tank 129 by controlling the secondary valve arrangement 236.

Further, the pressurized part 204 of the fluid system 202 may include a secondary automatic shut-off valve 238. The secondary automatic shut-off valve 238 may be included in the secondary valve arrangement 236. Thus, the secondary valve arrangement 236 may comprise the secondary automatic shut-off valve 238. The first intake line 206 of the secondary fluid tank 129 and the second pressurized fluid conduit arrangement 226 may be arranged to be fluidly connected with one another via the secondary automatic shut-off valve 238. The control arrangement 228 may be arranged to close the secondary automatic shut-off valve 238 when the vehicle 100 is turned or powered off or when the vehicle 100 experiences an accident. The control arrangement 228 may be configured to control the fluid from the secondary fluid tank 129 by controlling the secondary automatic shut-off valve 238.

Each of the primary valve arrangement 232 and the secondary valve arrangement 236 may be arranged to control to the primary and secondary fluid tanks 127, 129 to supply liquefied fluid to the second pressurized fluid conduit arrangement 226 when the pressure of the fluid in the pressurized part 204 is below a certain level, for example 10 bar. Each of the primary valve arrangement 232 and the secondary valve arrangement 236 may be arranged to control to the primary and secondary fluid tanks 127, 129 to supply vaporised fluid to the second pressurized fluid conduit arrangement 226 when the pressure of the fluid in the pressurized part 204 is above a certain level, for example 10 bar. This may ensure that the pressure of the fluid in the primary and secondary fluid tanks 127, 129 does not drop too rapidly. Instead of a level of 10 bar, another suitable level can be chosen. How a valve arrangement can achieve this kind of switching between liquefied fluid supply and vaporised fluid, for example by means of a spring, is known to the person skilled in the art and thus not discussed in further detail.

Each of the primary and secondary fluid tanks 127, 129 has a second intake line 240, 242. Each of the second intake lines 240, 242 has an inlet 244, 246 located inside the fluid tank 127, 129. Each of the second intake lines 240, 242 may be a conduit. Each of the second intake lines 240, 242 is arranged to convey a fluid. The second intake line 240, 242 is part of the pressurized part 204 of the fluid system 202. The inlet 244, 246 of the second intake line 240, 242 is arranged to receive, or take in, a vapour of the fluid. The second intake lines 240, 242 are arranged to provide a vaporised fluid flow from the primary and secondary fluid tanks 127, 129 to the second pressurized fluid conduit arrangement 226. When the primary fluid tank 127 is installed, the inlet 210 of the first intake line 206 of the primary fluid tank 127 is located at a level below the inlet 244 of the second intake line 240 of the primary fluid tank 127. When the secondary fluid tank 129 is installed, the inlet 212 of the first intake line 208 of the secondary fluid tank 129 is located at a level below the inlet 246 of the second intake line 242 of the secondary fluid tank 129.

The second intake line 240 of the primary fluid tank 127 and the second pressurized fluid conduit arrangement 226 may be fluidly connectable to one another via the primary valve arrangement 232. Thus, according to this embodiment, the primary valve arrangement 232 and/or the primary automatic shut-off valve 234 are/is arranged to block the fluid flow from the first and/or second intake lines 206, 240 of the primary fluid tank 127 to the second pressurized fluid conduit arrangement 226. The primary valve arrangement 232 and/or the primary automatic shut-off valve 234 may also be arranged to allow the fluid flow from the first and/or second intake lines 206, 240 of the primary fluid tank 127 to the second pressurized fluid conduit arrangement 226.

The second intake line 242 of the secondary fluid tank 129 and the second pressurized fluid conduit arrangement 226 may be fluidly connectable to one another via the secondary valve arrangement 236. Thus, according to this embodiment, the secondary valve arrangement 236 and/or the secondary automatic shut-off valve 238 are/is arranged to block the fluid flow from the first and/or second intake lines 208, 242 of the secondary fluid tank 129 to the second pressurized fluid conduit arrangement 226. The secondary valve arrangement 236 and/or the secondary automatic shut-off valve 238 may also be arranged to allow the fluid flow from the first and/or second intake lines 208, 242 of the secondary fluid tank 129 to the second pressurized fluid conduit arrangement 226.

As mentioned above, the fluid system 202 includes a control arrangement 228 for determining the status of a primary fluid tank 127 or one or more secondary fluid tanks 129. For the shown embodiment, where the fluid may correspond to LNG, for example methane, the control arrangement 228 is configured to:

determine, by usage of the sensor 230, one or more pressure drops $\Delta p$ associated with the fluid flow through the second pressurized fluid conduit arrangement 226, when the pressure drop $\Delta p$ exceeds a threshold value, block the fluid flow from one 127, 129 of the primary and secondary fluid tanks 127, 129 to the second pressurized fluid conduit arrangement 226, for example by means of the primary valve arrangement 232, the primary automatic shut-off valve 234, the secondary valve arrangement 236 or the secondary automatic shut-off valve 238, while the fluid flow from the other one 127, 129 of the primary and secondary fluid tanks 127, 129 to the second pressurized fluid conduit arrangement 226 continues, if the pressure drop $\Delta p$ returns to a value below the threshold value when the fluid flow from said one 127, 129 of the primary and secondary fluid tanks 127, 129 to the second pressurized fluid conduit arrangement 226 is blocked, determine that said one 127, 129 of the primary and secondary fluid tanks 127, 129 is substantially empty of liquefied fluid, if the pressure drop $\Delta p$ remains above the threshold value when the fluid flow from said one 127, 129 of the primary and secondary fluid tanks 127, 129 to the second pressurized fluid conduit arrangement 226 is blocked, block, for example by means of the primary valve arrangement 232, the primary automatic shut-off valve 234, the secondary valve arrangement 236 or the secondary automatic shut-off valve 238, the fluid flow from the other one 127, 129 of the primary and secondary fluid tanks 127, 129 to the second pressurized fluid conduit arrangement 226 while allowing the fluid flow from said one 127, 129 of the primary and secondary fluid tanks 127, 129 with the previously blocked fluid flow to the second pressurized fluid conduit arrangement 226, if the pressure drop $\Delta p$ remains above the threshold value when the fluid flow from the other one 127, 129 of the primary and secondary fluid tanks 127, 129 to the second pressurized fluid conduit arrangement 226 is blocked, determine that both of the primary and secondary fluid tanks 127, 129 are substantially empty of liquefied fluid, and if the pressure drop $\Delta p$ returns to a value below the threshold value when the fluid flow from the other one 127, 129 of the primary and secondary fluid tanks 127, 129 to the second pressurized fluid conduit arrangement 226 is blocked, determine that the other one 127, 129 of the primary and secondary fluid tanks 127, 129 is substantially empty of liquefied fluid.

The threshold value may be a predetermined threshold value. The control arrangement 228 may be configured to compare the determined pressure drop $\Delta p$ with the threshold value.

Each of the primary and secondary fluid tanks 127, 129 may include a liquid level sensor 248, 250 for determining the height of the liquefied fluid inside the fluid tank 127, 129. However, such a liquid level sensor 248, 250 may not accurately give the liquid level of the liquefied fluid in the primary and secondary fluid tanks 127, 129, for example when the vehicle 100, which may carry the primary and secondary fluid tanks 127, 129, travels downhill or uphill a slope. For example, when the vehicle 100 travels downhill, the liquid level sensor 248, 250 may show that there is a relevant amount of liquefied fluid in the primary or secondary fluid tank 127, 129 despite the fact that the inlet 210, 212 of the first intake line 206, 208 is not in contact with the liquefied fluid. When the pressure drop $\Delta p$ exceeds the threshold value, the control arrangement 228 may be configured to block the fluid flow from the one 127, 129 of the primary and secondary fluid tanks 127, 129, which has the lowest height of liquefied fluid determined by the liquid level sensor 248, 250 in relation to the height of the liquefied fluid inside the other one 127, 129 of the primary and secondary fluid tanks 127, 129, to the second pressurized fluid conduit arrangement 226 while the fluid flow from the other one 127, 129 of the primary and secondary fluid tanks 127, 129 continues.

With reference to FIG. 2, the control arrangement 228 may include a pressure drop determination unit 260 for determining a pressure drop $\Delta p$ based on input from the sensor 230. The control arrangement 228 may include a valve control unit 262 for controlling the primary valve arrangement 232, the primary automatic shut-off valve 234, the secondary valve arrangement 236 and the secondary automatic shut-off valve 238, i.e. controlling by opening or closing the primary valve arrangement 232, the primary automatic shut-off valve 234, the secondary valve arrangement 236 and the secondary automatic shut-off valve 238. The control arrangement 228 may include a tank status determination unit 264 for determining the status of the primary fluid tank 127 or secondary fluid tank 129.

Figure 3:
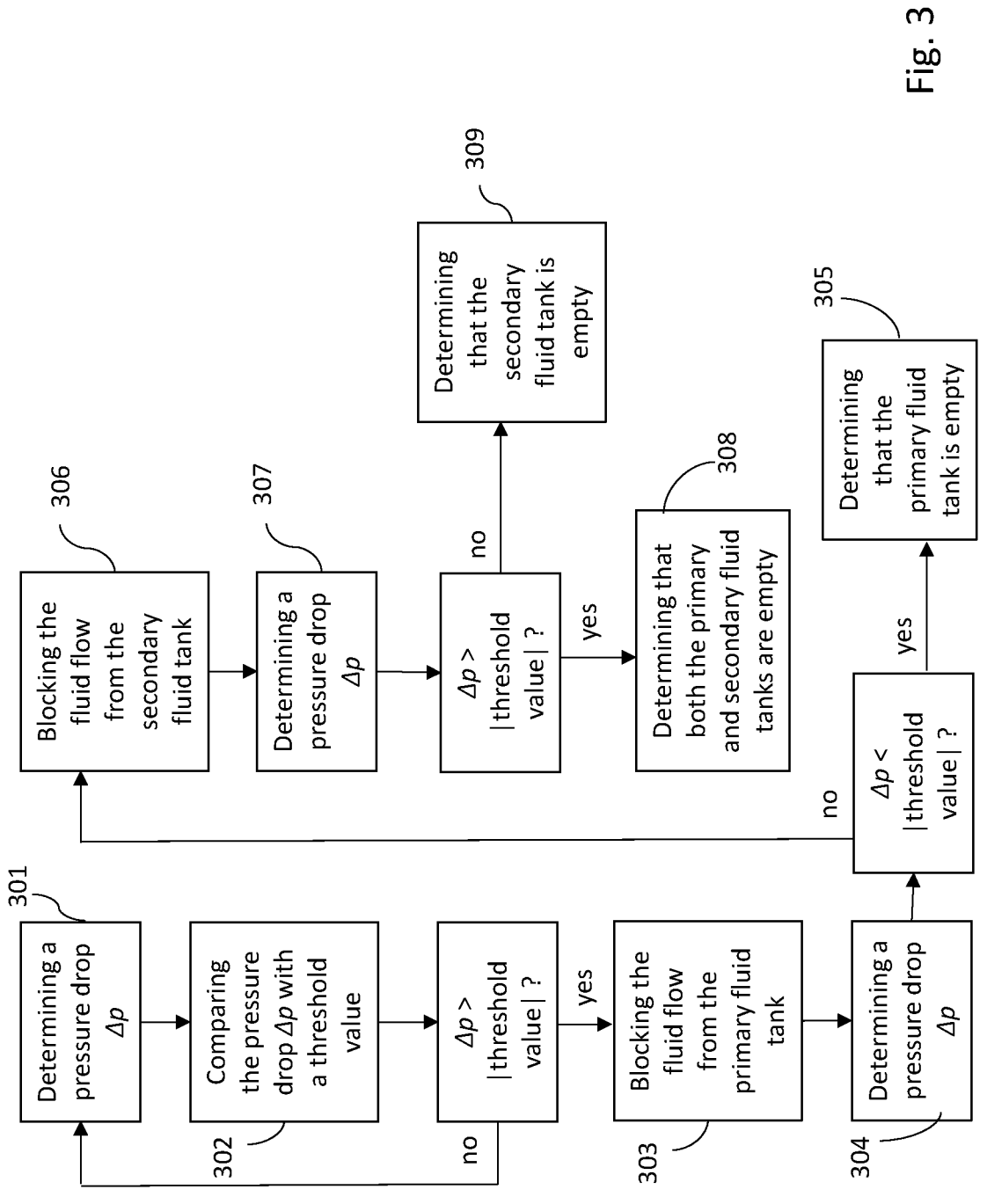
FIG. 3 is a flow chart illustrating an embodiment of the method according to the first aspect of the invention.

With reference to FIG. 3, an embodiment of the method according to the first aspect of the invention is illustrated for determining the status of a primary fluid tank 127 or one or more secondary fluid tanks 129, each of the primary and secondary fluid tanks 127, 129 being arranged to contain a fluid or a mixture of fluids available or present in liquefied form and vaporised form. For example, the status of the primary fluid tank 127 or the secondary fluid tank 129 may be substantially empty of liquefied fluid/LNG or not empty of liquefied fluid/LNG. The primary and secondary fluid tank 127, 129 may be included in a fluid system 202 as disclosed above.

Figure 4:
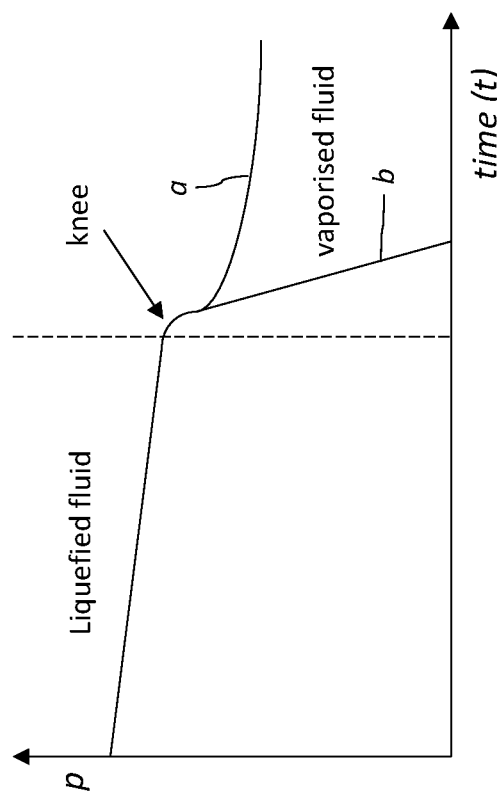
FIG. 4 is a schematic diagram illustrating a pressure drop exceeding a threshold value.

The method according to the shown embodiment comprises the steps of:

determining 301, by usage of the sensor, one or more pressure drops Δp associated with the fluid flow through the second pressurized fluid conduit arrangement. The pressure drop Δp may be given as a pressure decrease rate. The pressure drop Δp may be related to the fuel outtake speed, for example with the unit kg/h or kg/100 km;

comparing 302 the determined pressure drop Δp with a threshold value, which may essentially correspond to the knee indicated in the diagram of FIG. 4, which illustrates the pressure of the fluid in the second pressurized fluid conduit arrangement 226 over time. The threshold value may be a predetermined value. FIG. 4, pressure is placed on the y-axis and time is placed on the x axis. In FIG. 4, to the left of the vertical dotted line, most of the fluid is in liquefied form, and to the right of the vertical dotted line the fluid is more and more vaporised. The line a may illustrate the result of the performed method according to the first aspect of the invention. The line b may illustrate when the fluid flow from an empty fluid tank is not blocked;

when the pressure drop Δp exceeds the threshold value, blocking 303 the fluid flow from one of the primary and secondary fluid tanks to the second pressurized fluid conduit arrangement while the fluid flow from the other one of the primary and secondary fluid tanks to the second pressurized fluid conduit arrangement continues;

determining 304, by usage of the sensor, a pressure drop Δp associated with the fluid flow through the second pressurized fluid conduit arrangement when the fluid flow from said one of the primary and secondary fluid tanks to the second pressurized fluid conduit arrangement is blocked while the fluid flow from the other one of the primary and secondary fluid tanks to the second pressurized fluid conduit arrangement continues;

if the pressure drop Δp returns to a value below the threshold value when the fluid flow from said one of the primary and secondary fluid tanks to the second pressurized fluid conduit arrangement is blocked and when the fluid flow from the other one of the primary and secondary fluid tanks to the second pressurized fluid conduit arrangement continues, determining 305 that said one of the primary and secondary fluid tanks. i.e. the fluid tank with a presently blocked fluid flow to the second pressurized fluid conduit arrangement, is substantially empty of liquefied fluid, if the pressure drop Δp remains above the threshold value when the fluid flow from said one of the primary and secondary fluid tanks to the second pressurized fluid conduit arrangement is blocked and when the fluid flow from the other one of the primary and secondary fluid tanks to the second pressurized fluid conduit arrangement continues, blocking 306 the fluid flow from the other one of the primary and secondary fluid tanks to the second pressurized fluid conduit arrangement while allowing the fluid flow from said one of the primary and secondary fluid tanks with the previously blocked fluid flow to the second pressurized fluid conduit arrangement;

determining 307, by usage of the sensor, a pressure drop Δp associated with the fluid flow through the second pressurized fluid conduit arrangement when the fluid flow from the other one of the primary and secondary fluid tanks to the second pressurized fluid conduit arrangement is blocked while the fluid flow from said one of the primary and secondary fluid tanks with the previously blocked fluid flow to the second pressurized fluid conduit arrangement is allowed;

if the pressure drop Δp remains above the threshold value when the fluid flow from the other one of the primary and secondary fluid tanks to the second pressurized fluid conduit arrangement is blocked and when the fluid flow from said one of the primary and secondary fluid tanks, with the previously blocked fluid flow, to the second pressurized fluid conduit arrangement is allowed, determining 308 that both the primary and secondary fluid tanks are substantially empty of liquefied fluid;

if the pressure drop Δp returns to a value below the threshold value when the fluid flow from the other one of the primary and secondary fluid tanks to the second pressurized fluid conduit arrangement is blocked and when the fluid flow from said one of the primary and secondary fluid tanks, with the previously blocked fluid flow, to the second pressurized fluid conduit arrangement is allowed, determining 309 that the other one of the primary and secondary fluid tanks, i.e. the fluid tank with a presently blocked fluid flow to the second pressurized fluid conduit arrangement, is substantially empty of liquefied fluid.

It is to be understood that all steps of determining a pressure drop Δp may be followed by a step of comparing the pressure drop Δp with the threshold value. The threshold value may be a predetermined threshold value. As mentioned above in connection with FIG. 2, the fluid may comprise a fuel. The fluid may comprise a liquefied natural gas, LNG, for example methane.

When each of the primary and secondary fluid tanks 127, 129 comprises a liquid level sensor 248, 250 for determining the height of the liquefied fluid inside the fluid tank 127, 129, the first step of blocking 303 the fluid flow from one of the primary and secondary fluid tanks to the second pressurized fluid conduit arrangement when the pressure drop Δp exceeds the threshold value may comprise blocking the fluid flow from the one of the primary and secondary fluid tanks 127, 129 which has the lowest height of liquefied fluid determined by the liquid level sensor 248, 250 in relation to the height of the liquefied fluid inside the other one of the primary and secondary fluid tanks 127, 129, to the second pressurized fluid conduit arrangement 226 while the fluid flow from the other one 127, 129 of the primary and secondary fluid tanks 127, 129 continues. However, alternatively, the first blocking could be performed by blocking the fluid flow from any one 127, 129 of the primary and secondary fluid tanks 127, 129.

When the sensor 230 includes a pressure sensor for measuring the pressure of the fluid in the pressurized part 204 or the second pressurized fluid conduit arrangement, the steps of determining the pressure drop Δp associated with the fluid flow through the second pressurized fluid conduit arrangement 226 may include measuring the pressure drop Δp by usage of the pressure sensor.

Unless disclosed otherwise, it should be noted that the method steps illustrated in FIG. 3 and described herein do not necessarily have to be executed in the order illustrated in FIG. 3.

Figure 5:
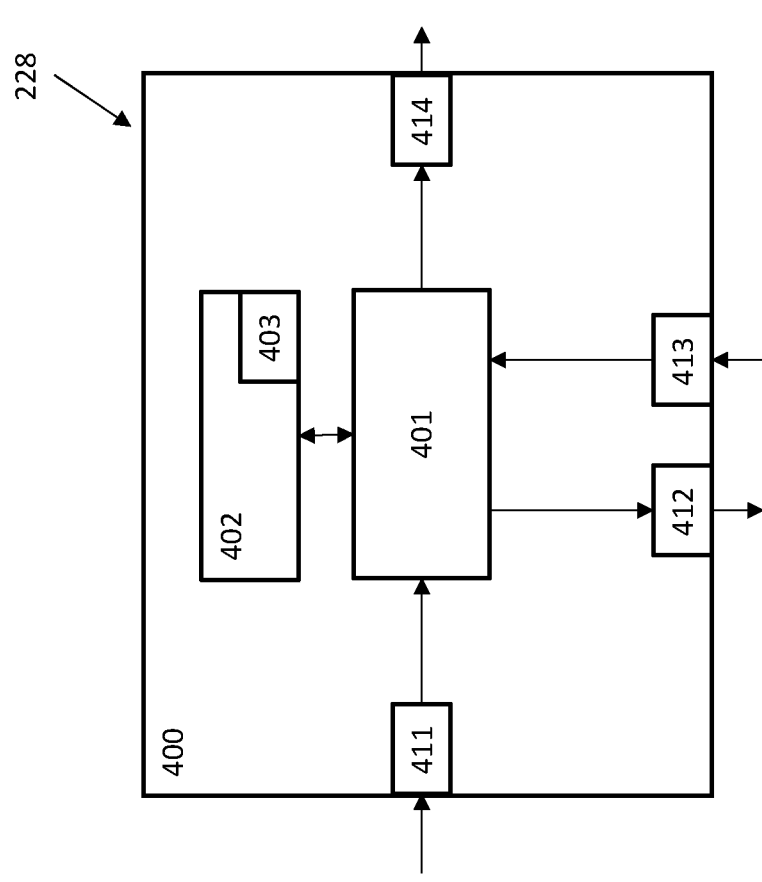
FIG. 5 is a schematic diagram illustrating a control arrangement according to the fourth aspect of the invention.

FIG. 5 shows in schematic representation of the control arrangement 228, which may include a control unit 400, which may correspond to or may include one or more of the above-mentioned units 260, 262, 264 of the control arrangement 228. The control unit 400 may comprise a computing unit 401, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 401 is connected to a memory unit 402 arranged in the control unit 400. The memory unit 402 provides the computing unit 401 with, for example, the stored program code and/or the stored data which the computing unit 401 requires to be able to perform computations. The computing unit 401 may also be arranged to store partial or final results of computations in the memory unit 402.

In addition, the control unit 400 may be provided with devices 411, 412, 413, 414 for receiving and transmitting input and output signals. These input and output signals can contain waveforms, impulses, or other attributes which, by means of the devices 411, 413 for the reception of input signals, can be detected as information and can be converted into signals which can be processed by the computing unit 401. These signals are then made available to the computing unit 401. The devices 412, 414 for the transmission of output signals are arranged to convert signals received from the computing unit 401 in order to create output signals by, for example, modulating the signals, which can be transmitted to other parts of and/or systems in the vehicle 100.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection.

Control systems in modern vehicles commonly comprise communication bus systems consisting of one or more communication buses for linking a plurality of electronic control units (ECU's), or controllers, and various components located in the vehicle. Such a control system can comprise a large number of control arrangements and/or control units and the responsibility for a specific function can be divided amongst more than one control unit. Vehicles of the shown type thus often comprise significantly more control units than are shown in FIGS. 2 and 5, which is well known to the person skilled in the art within this technical field. Alternatively or in addition thereto, the embodiments of the present invention may be implemented wholly or partially in one or more other control units already present in the vehicle.

Here and in this document, units are often described as being provided for performing steps of the method according to embodiments of the invention. This also includes that the units are designed to and/or arranged to perform these method steps.

The units 260, 262, 264 of the control arrangement 228 are in FIG. 2 illustrated as separate units. These units 260, 262, 264 may, however, be logically separated but physically implemented in the same unit, or can be both logically and physically arranged together. These units 260, 262, 264 may for example correspond to groups of instructions, which can be in the form of programming code, that are input into, and are utilized by a processor/computing unit 401 when the units are active and/or are utilized for performing its method step.

The control arrangement 228, which may include one or more control units 400, e.g. a device or a control device, according to embodiments of the present invention may be configured for performing all of the method steps mentioned above, in the claims, and in connection with the herein described embodiments. The control arrangement 228 is associated with the above described advantages for each respective embodiment.

According to the second aspect of the invention, a computer program 403 (see FIG. 5) is provided, comprising instructions which, when the program is executed by a computer, cause the computer to carry out the method according to one or more of the embodiments disclosed above.

According to the third aspect of the invention, a computer-readable medium is provided, comprising instructions which, when the instructions are executed by a computer, cause the computer to carry out the method according to one or more of the embodiments disclosed above.

The person skilled in the art will appreciate that a the herein described embodiments of the method according to the first aspect may be implemented in a computer program 403, which, when it is executed in a computer, instructs the computer to execute the method. The computer program is usually constituted by a computer program product stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

The present invention is not limited to the above described embodiments. Instead, the present invention relates to, and encompasses all different embodiments being included within the scope of the independent claims.

The invention claimed is:

1. A method for determining the status of a primary fluid tank or one or more secondary fluid tanks, each of the primary and secondary fluid tanks being arranged to contain a fluid or a mixture of fluids available in liquefied form and vaporised form, wherein the primary and secondary fluid tanks are parts of a pressurized part of a fluid system, wherein each of the primary and secondary fluid tanks has a first intake line having an inlet located inside a respective one of the primary and secondary fluid tanks, the first intake lines being part of the pressurized part, wherein the inlets of the first intake lines are arranged to mainly receive a liquid of the fluid, wherein the primary and secondary fluid tanks are in vapour communication with one another via a first pressurized fluid conduit arrangement such that a vapour of the fluid can travel from one of the primary fluid tank and the secondary fluid tank to the other one of the primary fluid tank and the secondary fluid tank, the first pressurized fluid conduit arrangement being part of the pressurized part of the fluid system, wherein the first intake lines are arranged to be fluidly connected to a second pressurized fluid conduit arrangement and arranged to provide a fluid flow from the primary and secondary fluid tanks to the second pressurized fluid conduit arrangement, the second pressurized fluid conduit arrangement being part of the pressurized part of the fluid system, wherein the fluid system comprises one or more sensors for determining one or more pressures of the fluid in the pressurized part, wherein the method comprises:

determining, by usage of the one or more sensors, one or more pressure drops (Δp) associated with the fluid flow through the second pressurized fluid conduit arrangement;

when a pressure drop (Δp) exceeds a threshold value, blocking the fluid flow from one of the primary and secondary fluid tanks to the second pressurized fluid conduit arrangement while the fluid flow from the other one of the primary and secondary fluid tanks to the second pressurized fluid conduit arrangement continues; and determining, by usage of the one or more sensors, a pressure drop (Δp) associated with the fluid flow through the second pressurized fluid conduit arrangement when the fluid flow from said one of the primary and secondary fluid tanks to the second pressurized fluid conduit arrangement is blocked while the fluid flow from the other one of the primary and secondary fluid tanks to the second pressurized fluid conduit arrangement continues, wherein the method further comprises:

if the pressure drop (Δp) returns to a value below the threshold value when the fluid flow from said one of the primary and secondary fluid tanks to the second pressurized fluid conduit arrangement is blocked, determining that said one of the primary and secondary fluid tanks is empty of liquefied fluid, or the method further comprises:

if the pressure drop (Δp) remains above the threshold value when the fluid flow from said one of the primary and secondary fluid tanks to the second pressurized fluid conduit arrangement is blocked, blocking the fluid flow from the other one of the primary and secondary fluid tanks to the second pressurized fluid conduit arrangement while allowing the fluid flow from said one of the primary and secondary fluid tanks with the previously blocked fluid flow to the second pressurized fluid conduit arrangement;

determining, by usage of the one or more sensors, a pressure drop (Δp) associated with the fluid flow through the second pressurized fluid conduit arrangement when the fluid flow from the other one of the primary and secondary fluid tanks to the second pressurized fluid conduit arrangement is blocked while the fluid flow from said one of the primary and secondary fluid tanks with the previously blocked fluid flow to the second pressurized fluid conduit arrangement is allowed;

if the pressure drop (Δp) remains above the threshold value when the fluid flow from the other one of the primary and secondary fluid tanks to the second pressurized fluid conduit arrangement is blocked, determining that the primary and secondary fluid tanks are empty of liquefied fluid;

if the pressure drop (Δp) returns to a value below the threshold value when the fluid flow from the other one of the primary and secondary fluid tanks to the second pressurized fluid conduit arrangement is blocked, determining that the other one of the primary and secondary fluid tanks is empty of liquefied fluid.

2. A method according to claim 1, wherein each of the primary and secondary fluid tanks comprises a liquid level sensor arranged to determining a height of the liquefied fluid inside a respective one of the primary and secondary fluid tanks, wherein the blocking the fluid flow from one of the primary and secondary fluid tanks to the second pressurized fluid conduit arrangement when the pressure drop (Δp) exceeds the threshold value comprises blocking the fluid flow from the one of the primary and secondary fluid tanks, which has a lowest height of liquefied fluid determined by the liquid level sensor in relation to a height of liquefied fluid inside the other one of the primary and secondary fluid tanks, to the second pressurized fluid conduit arrangement while the fluid flow from the other one of the primary and secondary fluid tanks continues.

3. A method according to claim 1, wherein the method comprises comparing the determined pressure drop (Δp) with the threshold value.

4. A method according to claim 1, wherein the one or more sensors comprises a pressure sensor for measuring the pressure of the fluid in the pressurized part, and wherein the step of determining the pressure drop (Δp) associated with the fluid flow through the second pressurized fluid conduit arrangement comprises measuring the pressure drop (4p) by usage of the pressure sensor.

5. A method according to claim 1, wherein the fluid comprises a fuel.

6. A method according to claim 1, wherein the fluid comprises a liquefied natural gas, LNG.

7. A control arrangement for determining the status of a primary fluid tank or one or more secondary fluid tanks, each of the primary and secondary fluid tanks being arranged to contain a fluid or a mixture of fluids available in liquefied form and vaporised form, wherein the primary and secondary fluid tanks are parts of a pressurized part of a fluid system, wherein each of the primary and secondary fluid tanks has a first intake line having an inlet located inside a respective one of the primary and secondary fluid tanks, the first intake lines being part of the pressurized part, wherein the inlets of the first intake lines are arranged to mainly receive a liquid of the fluid, wherein the primary and secondary fluid tanks are arranged to be in vapour communication with a ventilation connector via a first pressurized fluid conduit arrangement such that a vapour of the fluid can travel from one of the primary fluid tank and the secondary fluid tank to the other one of the primary fluid tank and the secondary fluid tank, the first pressurized fluid conduit arrangement being part of the pressurized part of the fluid system, wherein the first intake lines are arranged to be fluidly connected to a second pressurized fluid conduit arrangement and are arranged to provide a fluid flow from the primary and secondary fluid tanks to the second pressurized fluid conduit arrangement, the second pressurized fluid conduit arrangement being part of the pressurized part of the fluid system, wherein the fluid system comprises one or more sensors for determining one or more pressures of the fluid in the pressurized part, wherein the control arrangement is configured to:

determine, by usage of the one or more sensors, one or more pressure drops (Δp) associated with the fluid flow through the second pressurized fluid conduit arrangement, when a pressure drop (Δp) exceeds a threshold value, block the fluid flow from one of the primary and secondary fluid tanks to the second pressurized fluid conduit arrangement while the fluid flow from the other one of the primary and secondary fluid tanks to the second pressurized fluid conduit arrangement continues, if the pressure drop ($\Delta p$) returns to a value below the threshold value when the fluid flow from said one of the primary and secondary fluid tanks to the second pressurized fluid conduit arrangement is blocked, determine that said one of the primary and secondary fluid tanks is empty of liquefied fluid, if the pressure drop ($\Delta p$) remains above the threshold value when the fluid flow from said one of the primary and secondary fluid tanks to the second pressurized fluid conduit arrangement is blocked, block the fluid flow from the other one of the primary and secondary fluid tanks to the second pressurized fluid conduit arrangement while allowing the fluid flow from said one of the primary and secondary fluid tanks with the previously blocked fluid flow to the second pressurized fluid conduit arrangement, if the pressure drop ($\Delta p$) remains above the threshold value when the fluid flow from the other one of the primary and secondary fluid tanks to the second pressurized fluid conduit arrangement is blocked, determine that the primary and secondary fluid tanks are empty of liquefied fluid, and if the pressure drop ($\Delta p$) returns to a value below the threshold value when the fluid flow from the other one of the primary and secondary fluid tanks to the second pressurized fluid conduit arrangement is blocked, determine that the other one of the primary and secondary fluid tanks is empty of liquefied fluid.

8. A fluid system comprising a pressurized part, the pressurized part comprising a primary fluid tank arranged to contain a fluid or a mixture of fluids available in liquefied form and vaporised form, one or more secondary fluid tanks arranged to contain a fluid or a mixture of fluids available in liquefied form and vaporised form, wherein each of the primary and secondary fluid tanks has a first intake line having an inlet located inside a respective one of the primary and secondary fluid tanks, the first intake lines being part of the pressurized part, wherein the inlets of the first intake lines are arranged to mainly receive a liquid of the fluid, a first pressurized fluid conduit arrangement arranged to fluidly connect the primary and secondary fluid tanks with a ventilation connector of the first pressurized fluid conduit arrangement, whereby a vapour communication between the primary and secondary fluid tanks is provided such that a vapour of the fluid can travel from one of the primary fluid tank and the secondary fluid tank to the other one of the primary fluid tank and the secondary fluid tank, and a second pressurized fluid conduit arrangement arranged to be fluidly connected to the first intake lines, wherein the first intake lines are arranged to provide a fluid flow from the primary and secondary fluid tanks to the second pressurized fluid conduit arrangement, wherein the fluid system comprises one or more sensors for determining one or more pressures of the fluid in the pressurized part, and wherein the fluid system comprises a control arrangement according to claim 7.

9. A fluid system according to claim 8, wherein each of the primary and secondary fluid tanks has a ventilation outlet arranged to be fluidly connected to the first pressurized fluid conduit arrangement, wherein when the primary fluid tank is installed, the inlet of the first intake line of the primary fluid tank is located at a level below the ventilation outlet of the primary fluid tank, and wherein when the secondary fluid tank is installed, the inlet of the first intake line of the secondary fluid tank is located at a level below the ventilation outlet of the secondary fluid tank.

10. A fluid system according to claim 9, wherein the first pressurized fluid conduit arrangement comprises a primary valve device and a secondary valve device, each of the primary and secondary valve devices being arranged to be manually operated, and wherein the ventilation outlet of the primary fluid tank is fluidly connectable to the ventilation outlet of the secondary fluid tank via the primary and secondary valve devices.

11. A fluid system according to claim 8, wherein each of the primary and secondary fluid tanks has a second intake line having a second inlet located inside a respective one of the primary and secondary fluid tanks, the second intake lines being part of the pressurized part, wherein the second inlets of the second intake lines are arranged to receive a vapour of the fluid, wherein the second intake lines are arranged to provide a vaporised fluid flow from the primary and secondary fluid tanks to the second pressurized fluid conduit arrangement, wherein when the primary fluid tank is installed, the inlet of the first intake line of the primary fluid tank is located at a level below the second inlet of the second intake line of the primary fluid tank, and wherein when the secondary fluid tank is installed, the inlet of the first intake line of the secondary fluid tank is located at a level below the second inlet of the second intake line of the secondary fluid tank.

12. A fluid system according to claim 8, wherein each of the primary and secondary fluid tanks is arranged to contain a fluid in the form of a liquefied natural gas, LNG.

\* \* \* \* \*